No. 12,086. REISSUED FEB. 24, 1903.

J. S. SOUREK.

BUCKLE.

APPLICATION FILED JAN. 21, 1903.

Witnesses:
Maude Grisler.
Walter Bowman.

Inventor:
Joseph S. Sourek;
By C. E. Humphrey.
Atty.

UNITED STATES PATENT OFFICE.

JOSEPH S. SOUREK, OF GHENT, OHIO.

BUCKLE.

SPECIFICATION forming part of Reissued Letters Patent No. 12,086, dated February 24, 1903.

Original No. 714,828, dated December 2, 1902. Application for reissue filed January 21, 1903. Serial No. 140,040.

*To all whom it may concern:*

Be it known that I, JOSEPH S. SOUREK, a citizen of the United States, residing at Ghent, in the county of Summit and State of Ohio, have invented a certain new and useful Improvement in Buckles, of which the following is a specification.

My invention has a general relation to improvements in buckles for securing straps of belting, either of leather or woven fabric, and is especially designed for connecting straps of the latter material of different widths, and particularly those for connecting the ends of harvester-belts.

The objects of my invention are to provide a new and improved buckle of the particular class designated which shall securely hold the belt without materially puncturing it, to shield the points or tongues of the buckle, so as not to catch or engage any object, and to simplify the manner of releasing the buckle from the strap.

To the accomplishment of the aforesaid objects my invention consists in the peculiar and novel construction, arrangement, and combination of parts hereinafter described and then specifically pointed out in the claims, reference being had to the accompanying drawings, which form a part of this specification.

Figure 1:
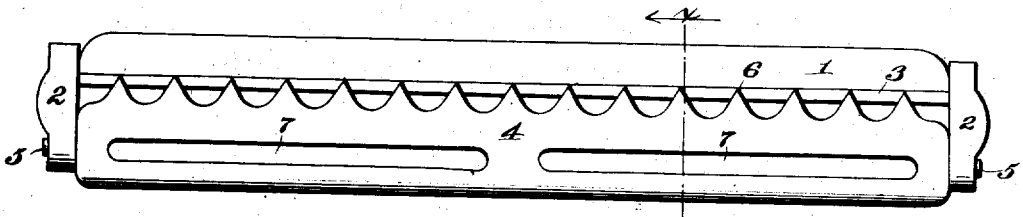
Figure 2:
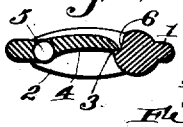
Figure 3:
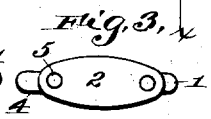
Figure 4:
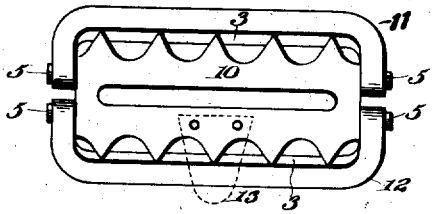
Figure 5:
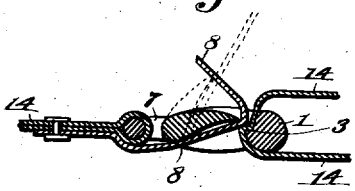

In the accompanying drawings, in which similar reference-numerals indicate like parts in the different figures, Figure 1 is a long buckle embodying my invention; Fig. 2, a section of the same at the line *x x*; Fig. 3, an end view of the same looking from the right of Fig. 1; Fig. 4, a double buckle involving my improvement; Fig. 5, a section of a buckle substantially similar to Fig. 1, but showing a supplemental short strap of fabric to assist in opening the buckle when the main strap is tightly drawn.

For convenience of description the movable part that engages the strap will be termed the "tongue" and the other portion, in which it is pivoted, the "rim."

Referring to Figs. 1, 2, and 3, the rim consists of a bar 1, to which are rigidly secured two end pieces 2, that may be riveted in place, as shown, or made integral, and the bar 1 has along its inner upper face a rabbeted groove forming a ledge 3 for the teeth of the tongue to rest on. The tongue 4 consists of a plate adapted to rest between the end pieces 2, to which it is pivotally connected by slender trunnions 5 and is practically rounded and thick at the back and thence tapers to a thin edge, which is inwardly grooved at intervals, leaving conical points 6 between, arranged to rest on the ledge 3. In the back of the tongue are two elongated openings or slots 7 for the purpose of securing one end of the belt. A single opening might be used; but the extreme length of the tongue would tend to render the rod that the belt is attached to too weak under the necessary strain of the belt, so that it would bend. Hence it is divided into two openings and the belt cut so as to form two ends to be attached thereto.

This buckle is attached to one end of the belt, as just suggested, and in use the free end of the belt passed inside the rim, drawn tight, and the tongue pressed down to engage it in the usual manner. In this latter process the peculiar shape of the points 6 are of advantage, as they barely enter the canvas, but do not project through to any appreciable extent, thus permitting the unclasping of the buckle when necessary. This is also more easily done by the device shown in Fig. 5, which in addition to the belt 14 I secure to the end that passes around the loop of the tongue an additional piece 8 of the same material and pass it into the buckle with the belt at the time of putting in the latter. This additional piece does not interfere with the action of the belt, and when it is desired to release the latter it is done by drawing the free end of the piece 8 outward, as indicated in dotted lines in Fig. 5, thus lifting the tongue from engagement.

Instead of fastening one end of the belt permanently to the loop of the tongue my buckle may be varied slightly in construction, as illustrated in Fig. 4. In this construction the tongue 10 is of the same general structure as the one in Fig. 1, except that it is double—that is, it has points at each edge—and it has two rims 11 12, pivotally secured to it, each having ledges for the teeth, as in the other form. By this arrangement both free ends of the belt may be quickly and securely united from opposite directions by passing them into the rims on their respective sides. To facilitate unclasping this belt, I secure to one side of the tongue a projecting plate 13, (indicated by dotted lines,) by which the tongue may be rocked to release either end of the belt. This plate may be applied with equal advantage to the form shown in Fig. 1, if desired.

In both forms the depth of the rabbeted groove will be adapted to the peculiar necessities of the strap to be secured, and when the strap is heavy the groove should be deeper than when the material is lighter.

Having thus described my invention, what I claim, and desire to secure by Letters Patent, is—

1. An improved buckle consisting of a rim the central portion of which is substantially round in cross-section with oppositely-disposed side arms to form bearings for the tongue-pivots, said central portion having an angular groove toward the pivot side to form a seat for the tongue, and a tongue pivoted between the side arms, with one edge arranged to rest on the lower ledge of said groove, and preferably corrugated to form points in alinement with said tongue to engage the belt, and the other having a longitudinal slot, leaving at its free end a rod to which to secure one end of the belt, substantially as shown and described.

2. An improved buckle having a tongue with opposite indented edges, and oppositely-disposed rims pivotally connected with the ends of said tongue, each rim having ledges to arrest the descent of the adjacent indented edge of said tongue, substantially as shown and described.

3. The combination with a harvester-belt buckle having a rim, and a movable tongue to engage the belt, of a supplemental strap secured to said belt, having a free end and passing therewith through said buckle to form a means for raising said tongue out of engagement with the belt when desired, substantially as shown and described.

In testimony that I claim the above I hereunto set my hand in the presence of two subscribing witnesses.

JOSEPH S. SOUREK.

In presence of—
C. E. HUMPHREY,
MAUDE ZWISLER.